US008386966B1

(12) United States Patent
Attinasi et al.

(10) Patent No.: US 8,386,966 B1
(45) Date of Patent: Feb. 26, 2013

(54) REAL-TIME TRACKING OF USER-APPLICATION INTERACTION

(75) Inventors: Marc J. Attinasi, Ramona, CA (US); Igor A. Podgorny, San Diego, CA (US); Fedor N. Dzegilenko, San Jose, CA (US); Floyd J. Morgan, Carlsbad, CA (US); Vineet Singh, Cupertino, CA (US); Troy D. Otillio, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 283 days.

(21) Appl. No.: 12/841,838

(22) Filed: Jul. 22, 2010

(51) Int. Cl.
*G06F 3/00* (2006.01)
*G06F 9/44* (2006.01)
*H04M 11/00* (2006.01)

(52) U.S. Cl. ............... 715/866; 715/762; 379/93.01; 717/104

(58) Field of Classification Search ............ 715/866, 715/762; 379/93; 717/104
See application file for complete search history.

(56) References Cited

U.S. PATENT DOCUMENTS

| 7,657,554 | B2* | 2/2010 | Murphy et al. | 715/206 |
| 7,814,420 | B2* | 10/2010 | Gerhart et al. | 715/705 |
| 7,849,405 | B1* | 12/2010 | Coletta et al. | 715/708 |
| 7,975,223 | B2* | 7/2011 | Plumley et al. | 715/255 |
| 8,099,673 | B2* | 1/2012 | Parkinson | 715/762 |
| 2002/0118220 | A1* | 8/2002 | Lui et al. | 345/709 |
| 2006/0036991 | A1* | 2/2006 | Biazetti et al. | 717/104 |
| 2007/0050719 | A1* | 3/2007 | Lui et al. | 715/762 |
| 2008/0177750 | A1* | 7/2008 | Ricker | 707/10 |
| 2010/0332586 | A1* | 12/2010 | Jogand-Coulomb et al. | 709/203 |

* cited by examiner

*Primary Examiner* — David Phantana Angkool
(74) *Attorney, Agent, or Firm* — Park, Vaughan Fleming & Dowler LLP; Chia-Hsin Suen

(57) ABSTRACT

Some embodiments provide a system that monitors use of an application. During operation, the system uses the application to track a set of interactions between a set of users and the application without impacting the performance of the application. Next, the system stores the interactions as the interactions are detected by the application. Finally, for each user from the set of users, the system periodically processes a subset of the stored interactions associated with the user to obtain an activity history for the user, wherein the activity history is used to facilitate subsequent real-time use of the application by the user.

21 Claims, 3 Drawing Sheets

US 8,386,966 B1

REAL-TIME TRACKING OF USER-APPLICATION INTERACTION

RELATED APPLICATION

The subject matter of this application is related to the subject matter in a co-pending non-provisional application by inventors Igor A. Podgorny, Fedor N. Dzegilenko, Martha J. Fiske, Jason A. Greschler and Floyd J. Morgan and filed on the same day as the instant application entitled "Question Prioritization in Community-Driven Question-and-Answer Systems," having Ser. No. 12/841,821, filed on 22 Jul. 2010.

The subject matter of this application is also related to the subject matter in a co-pending non-provisional application by inventors Igor A. Podgorny, Fedor N. Dzegilenko, Floyd J. Morgan, Vineet Singh, Marc J. Attinasi and Troy D. Otillio and filed on the same day as the instant application entitled "Real-Time User Behavior Prediction," having Ser. No. 12/841,831, and filed on 22 Jul. 2010.

BACKGROUND

Related Art

The present embodiments relate to techniques for facilitating use of application software for a computer system.

Application software may be used to perform tasks of varying duration and complexity. Furthermore, different amounts of user input and/or interaction with the software may be required to complete the tasks. For example, a user may spend several hours entering information into a tax preparation application to prepare and file his/her taxes, several minutes on an email client to send and receive emails, and/or several seconds starting and setting up a media player to play music. User experiences with an application may also vary based on the application's complexity, the user's familiarity with the application, and/or the domain of the application. For example, an accountant may find a tax preparation application to be simple or straightforward to use, while a user unfamiliar with tax law may find the same tax preparation application to be unusable.

Intelligent user interface design can facilitate interaction between an application and users of varying ability levels. For example, complex applications may include tutorials that explain the use of various features in the applications to the user. Use of help and/or support features may also improve a user's understanding of an application's user interface. For example, a user may browse or search an index of help topics to understand a confusing feature and/or part of an application. The user may also post questions on online forums to obtain support from customer care specialists and/or more advanced users of the application.

Similarly, the user may also choose between different versions of an application's user interface based on the user's aptitude in using the application. In addition, applications such as computer games and standardized tests may modulate the difficulty of the task at hand (e.g., game play, answering test questions, etc.) based on the precision, accuracy, and/or correctness of the user's input to the applications.

Finally, user issues with the user interface of an application may be identified and used to improve the user interface. For example, questions posted on online forums and/or other user feedback may be used by application designers or architects to determine problematic areas with an application's user interface and modify the user interface accordingly.

SUMMARY

The disclosed embodiments provide a system that monitors use of an application. During operation, the system uses the application to track a set of interactions between a set of users and the application without impacting the performance of the application. Next, the system stores the interactions as the interactions are detected by the application. Finally, for each user from the set of users, the system periodically processes a subset of the stored interactions associated with the user to obtain an activity history for the user, wherein the activity history is used to facilitate subsequent real-time use of the application by the user.

In some embodiments, the system also selects the users for tracking by the application based on the performance of the application.

In some embodiments, selecting the users for tracking by the application based on the performance of the application involves selecting an additional user for tracking by the application if a performance requirement is met by the application, and removing one of the users from tracking by the application if the performance requirement is not met by the application.

In some embodiments, periodically processing the subset of the interactions associated with the user to obtain an activity history for the user involves at least one of processing the subset of the stored interactions upon detecting a pre-specified number of interactions between the user and the application, and processing the subset of the stored interactions during a key stage of interaction between the user and the application.

In some embodiments, the key stage of interaction is at least one of initial use of the application, purchase of the application, and use of a complex feature in the application.

In some embodiments, each of the interactions corresponds to a page click or text input from the user.

In some embodiments, subsequent real-time use of the application by the user is facilitated by using the activity history to predict a probability of a user action in the application by the user, and modifying the probability by assisting the user with use of the application.

In some embodiments, the user action is at least one of discontinued use of the application and use of technical support for the application.

BRIEF DESCRIPTION OF THE FIGURES

In the figures, like reference numerals refer to the same figure elements.

DETAILED DESCRIPTION

Figure 1:
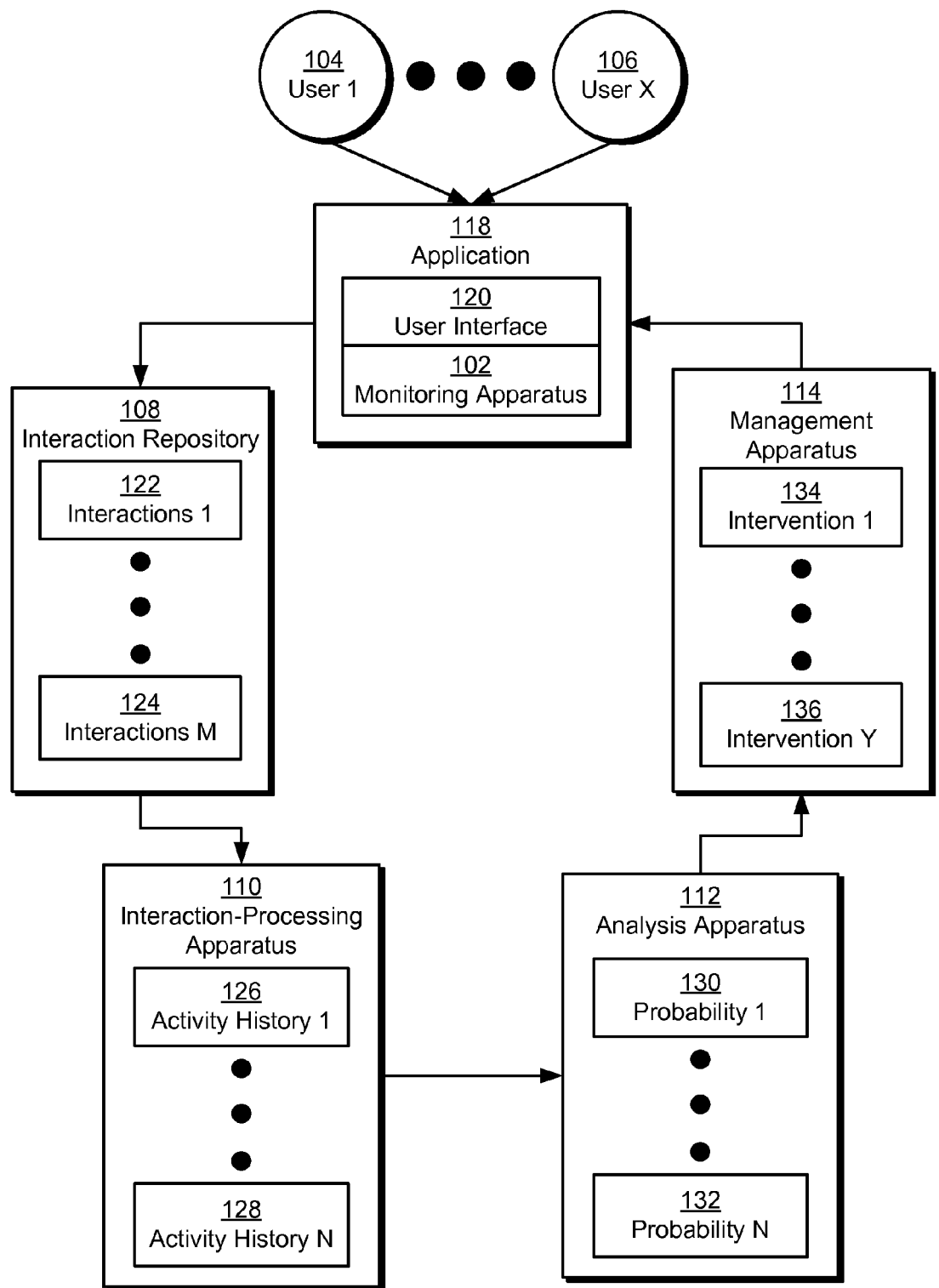
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating use of an application. The application may correspond to application software such as a word processor, an email client, a web browser, a web application, and/or a tax preparation application. The application may be used to perform one or more tasks for a user of the application. For example, the application may allow the user to create documents, display webpages, and/or prepare tax forms. Moreover, the user may interact with the application through the application's user interface.

More specifically, embodiments provide a method and system for monitoring real-time use of the application from the application. The application may track a set of interactions between a set of users and the application without impacting the performance of the application. Each interaction may correspond to a page click and/or text input from a user. The interactions may also be stored as the interactions are detected by the application. For example, data for each interaction may be pushed to a queue by the application as the interaction is received by the application.

The stored interactions may then be periodically processed to obtain activity histories for the users. Such periodic processing may be performed upon detecting a pre-specified number of interactions between the user and the application and/or during a key stage of interaction between the user and the application. In addition, the activity histories may be used to facilitate subsequent real-time use of the application by the users. For example, the activity history for a user may be analyzed to predict a probability of a user action in the application, such as discontinued use of the application and/or use of technical support for the application. The probability may then be modified by assisting the user with use of the application.

FIG. 1 shows a schematic of a system in accordance with an embodiment. The system includes a monitoring apparatus 102, an interaction-processing apparatus 110, an analysis apparatus 112, and a management apparatus 114. Each of these components is discussed in further detail below.

In one or more embodiments, the system of FIG. 1 is used to monitor and facilitate the use of an application 118 by a set of users (e.g., user 1 104, user x 106). Application 118 may correspond to a software program that is executed by a computing device, such as a personal computer (PC), laptop computer, mobile phone, portable media player, and/or server computer. For example, application 118 may be a word-processing application, an email client, an operating system, an accounting application, a web application, and/or a web browser. Application 118 may be distributed across one or more machines and accessed in various ways. For example, application 118 may be installed on a personal computer (PC) and executed through an operating system on the PC.

Moreover, application 118 may be implemented using a client-server architecture. Application 118 may be executed on one or more servers and accessed from other machines using a locally installed executable and/or a web browser and network connection. In other words, application 118 may be implemented using a cloud computing system that is accessed over the Internet. Regardless of the method of access, interaction between application 118 and the users may be facilitated through a user interface 120.

In particular, interactions (e.g., interactions 1 122, interactions m 124) between the users and application 118 may be enabled by user interface 120. For example, the users may provide interactive input (e.g., page clicks, text input, file uploads, gestures, etc.) to application 118 through a graphical user interface (GUI) provided by application 118 and view text, images, documents, menus, icons, form fields, webpages, and/or other elements of application 118 through the same GUI. Those skilled in the art will appreciate that other types of user interfaces, such as command line interfaces and/or web-based user interfaces, may also be used by application 118. Thus, application 118 is able to perform tasks by receiving input from and providing output to the users through user interface 120.

Those skilled in the art will appreciate that a user's overall experience with application 118 may be affected by factors such as the user's familiarity with application 118, the user's knowledge of the domain of application 118, and/or the complexity or design of application 118. For example, the user may find a web browser to be easy or straightforward to use and a tax-preparation application difficult or confusing to use. On the other hand, an accountant may have greater ease in using a tax-preparation application than a user who is unfamiliar with accounting and/or tax-preparation principles.

Furthermore, a user's experience with application 118 may affect his/her subsequent use of the application. For example, a user of a "try before you buy" application may choose not to purchase the application after experiencing difficulty and/or boredom with the application. Along the same lines, a user may incur additional costs from contacting technical support if the user cannot understand or use a feature of the application.

As described above, the system of FIG. 1 includes functionality to monitor and/or facilitate the use of application 118. First, monitoring apparatus 102 may track interactions between one or more users and application 118. The interactions may correspond to page clicks and/or text input from the users. For example, monitoring apparatus 102 may track the users' navigation through the webpages of a web application and/or form submissions to the web application. In addition, monitoring apparatus 102 may be implemented and/or provided by application 118 to enable tracking of the interactions in real-time from application 118.

Moreover, monitoring apparatus 102 may track the interactions without impacting the performance of application 118. Monitoring apparatus 102 may begin by tracking the interactions of a small set of users with application 118 and concurrently monitoring the performance of application 118. Afterwards, monitoring apparatus 102 may incrementally select additional users for tracking if a performance requirement is met by application 118. On the other hand, monitoring apparatus 102 may remove one or more users from tracking if the performance requirement is not met by application 118. Consequently, monitoring apparatus 102 may modulate the tracking of users in a way that maintains both the performance of application 118 and maximizes the number of tracked users.

Next, monitoring apparatus 102 may store the interactions in an interaction repository 108 as the interactions are detected. For example, upon detecting an interaction between a user and application 118, monitoring apparatus 102 may push a piece of data identifying the user and the interaction to a relational database and/or queue corresponding to interaction repository 108. As a result, interaction repository 108 may maintain a record of interactions between the user and application 118 at a latency that is low enough (e.g., on the order of milliseconds) to be real-time.

The stored interactions in interaction repository 108 may then be processed by interaction-processing apparatus 110 to obtain a set of activity histories (e.g., activity history 1 126, activity history n 128) for the users. Interaction-processing apparatus 110 may be external to application 118 to further reduce the performance impact associated with tracking users of application 118. For example, application 118, interaction repository 108, and interaction-processing apparatus 110 may reside on three different servers. As a result, the operation of interaction repository 108 and/or interaction-processing apparatus 110 may have little to no effect on the operation of application 118 and/or monitoring apparatus 102.

In one or more embodiments, interaction-processing apparatus 110 obtains an activity history for a user by periodically processing a subset of the stored interactions associated with the user in interaction repository 108. The activity history may include data and/or statistics related to the stored interactions for the corresponding user. For example, the activity history may include a ratio of unique page clicks to total page clicks, an inverse coefficient of variation, a number of interactions with a question-and-answer (Q&A) system associated with application 118, a user status, an availability of an email address for the user, and/or key words or phrases from the user's text input to application 118.

More specifically, processing of the subset of the stored interactions may be triggered upon detecting a pre-specified number of interactions between the user and application 118 and/or during a key stage of interaction between the user and application 118. For example, interaction-processing apparatus 110 may process the subset of interactions (e.g., interactions 1 122) in interaction repository 108 associated with the user (e.g., user 1 104) to obtain and/or update the activity history (e.g., activity history 1 126) after the user performs 20, 40, or 100 interactions with application 118. Interaction-processing apparatus 110 may additionally obtain and/or update the activity history during initial use of application 118, purchase of application 118, and/or use of a complex feature in application 118 by the user.

The activity history may then be used to facilitate subsequent real-time use of application 118 by the user. In particular, analysis apparatus 112 may apply a predictive model to the activity history to predict a probability (e.g., probability 1 130, probability n 132) of a user action in application 118 by the user. The user action may correspond to discontinued use of application 118 and/or use of technical support for application 118.

Analysis apparatus 112 and/or management apparatus 114 may then modify the probability by assisting the user with use of application 118. For example, analysis apparatus 112 and/or management apparatus 114 may increase use and/or adoption of application 118 by decreasing the probability of discontinued use of the application by the user. Similarly, analysis apparatus 112 and/or management apparatus 114 may reduce costs for both the user and the administrators (e.g., designers, engineers, support staff) of application 118 by decreasing the probability of using technical support for application 118 by the user.

To modify the probability, analysis apparatus 112 and/or management apparatus 114 may use the predictive model, activity history, and/or probability to determine whether the user should or should not be targeted with assisted use of application 118. For example, analysis apparatus 112 may use a logit model to predict each user's probability of discontinuing use of application 118 before the user purchases application 118. Analysis apparatus 112 may also calculate a targeted profit and an untargeted profit for one or more target groups of users (e.g., decile or percentile of probabilities). The targeted profit may be based on the cost of assisting each user with use of application 118 and a first number of users adopting application 118 after assistance is offered to the target group, while the untargeted profit may be based on a second number of users adopting application 118 without offering assistance to the target group.

The target group may then be targeted with assisted use of application 118 if the targeted profit is higher than the untargeted profit. In other words, the user may be targeted if the user is in a target group that responds positively to assisted use of application 118 (e.g., adopts application 118 because of the assisted use). On the other hand, the user may not be targeted if the user is in a target group that responds neutrally or negatively (e.g., discontinues use of application 118 because or in spite of the assisted use). Targeting of users based on analysis of monitored interactions is discussed in further detail in a co-pending non-provisional application by inventors Igor Podgorny, Fedor Dzegilenko, Floyd Morgan, Vineet Singh, Marc Attinasi and Troy Otillio and filed on the same day as the instant application entitled "Real-Time User Behavior Prediction," having Ser. No. 12/841,831, and filing date Jul. 22, 2010, which is incorporated herein by reference.

If analysis apparatus 112 finds a target group that responds positively to assisted use of application 118, management apparatus 114 may generate an intervention (e.g., intervention 1 134, intervention y 136) for each user in the target group. The intervention may assist the user with use of application 118 by advising the user to use the Q&A system associated with application 118. For example, the intervention may be provided and/or displayed through application 118 as an email and/or pop-up window and may include a link to the Q&A system, as well as a message suggesting that the user obtain assistance by submitting a question to the Q&A system.

The intervention may also prioritize questions submitted by the user to the Q&A system. Prioritization of questions in Q&A systems is discussed in a co-pending non-provisional application by inventors Igor Podgorny, Fedor Dzegilenko, Martha Fiske, Jason Greschler and Floyd Morgan and filed on the same day as the instant application entitled "Question Prioritization in Community-Driven Question-and-Answer Systems," having Ser. No. 12/841,821, and filing date Jul. 22, 2010, which is incorporated herein by reference.

As discussed above, the system of FIG. 1 may be used to detect and mitigate the potential occurrence of user actions in application 118. As a result, users may be tracked based on the occurrence and/or possibility of the user actions. For example, monitoring apparatus 102 may remove a user from tracking after the user adopts application 118, discontinues use of application 118, and/or uses technical support for application 118. Similarly, users associated with very low and/or high probabilities of user actions may be removed from tracking because the probabilities are unlikely to change much after such users are targeted with assisted use of application 118.

Consequently, the system of FIG. 1 may increase the usability and adoption of application 118 while reducing costs associated with the purchase and/or support of application 118. In particular, monitoring the use of application 118 may facilitate the identification of users who have difficulties with using application 118. At the same time, the monitoring may be performed in a way that both maintains performance in application 118 and allows for the tracking of a relatively large number of users in real-time. Finally, analysis of the monitored interactions may enable the users to be targeted before the users discontinue use of application 118 and/or use technical support for application 118, thus increasing revenue associated with adoption of application 118 and decreasing user and support costs associated with use of technical support for application 118.

Figure 2:
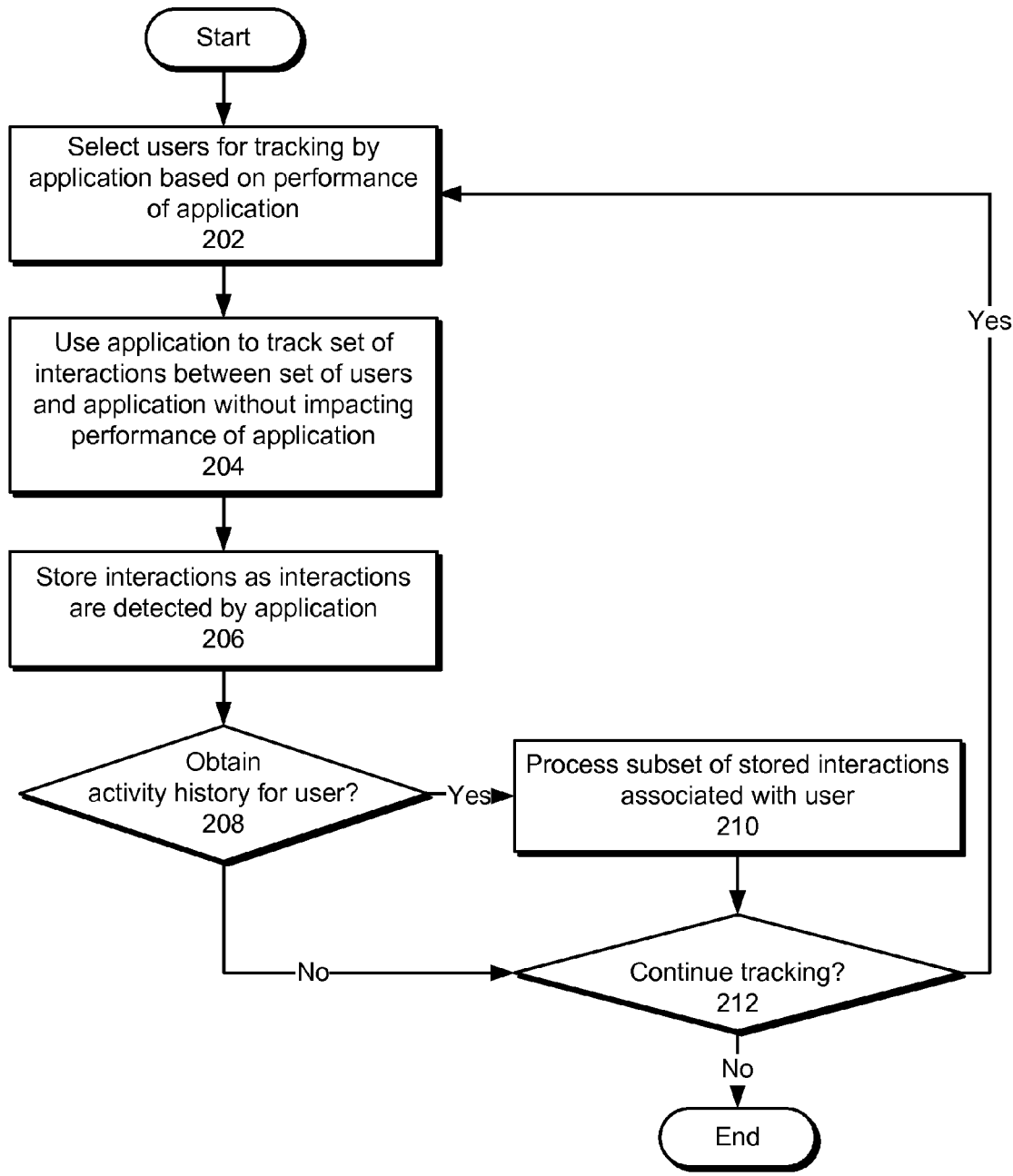
FIG. 2 shows a flowchart illustrating the process of monitoring use of an application in accordance with an embodiment.

FIG. 2 shows a flowchart illustrating the process of monitoring use of an application in accordance with an embodiment. In one or more embodiments, one or more of the steps may be omitted, repeated, and/or performed in a different order. Accordingly, the specific arrangement of steps shown in FIG. 2 should not be construed as limiting the scope of the embodiments.

Initially, a set of users is selected for tracking by the application based on the performance of the application (operation 202). For example, the application may begin by tracking a small set of users. The application may then select an additional user for tracking if a performance requirement is met by the application, or the application may remove one of the users from tracking if the performance requirement is not met by the application. As a result, the application may be used to track a set of interactions between the users and the application without impacting the performance of the application (operation 204). For example, the application may correspond to a web application that tracks the users' page clicks through webpages and/or text input from form submissions.

The interactions are stored as the interactions are detected by the application (operation 206). For example, interactions between a user and the application may be stored in a queue corresponding to the user. In addition, the interactions may be stored in real-time by pushing data identifying the interactions and the user to a database providing the queue as the interactions are received by the application.

An activity history for the user may additionally be obtained (operation 208) by periodically processing the subset of the stored interactions associated with the user. In particular, the subset of the stored interactions may be processed upon detecting a pre-specified number of interactions (e.g., 20, 40, 100, 200) between the user and the application. Processing of the subset of the stored interactions may also occur during a key stage of interaction between the user and the application (e.g., initial use of the application, purchase of the application, use of a complex feature in the application). If the activity history is not to be obtained, the subset of the stored interactions is not processed.

On the other hand, the activity history may be obtained by processing the subset of the stored interactions associated with the user (operation 210). Moreover, the activity history may be used to facilitate subsequent real-time use of the application by the user. For example, the activity history may be used to predict a probability of a user action in the application by the user, such as discontinued use of the application and/or use of technical support for the application. The probability may then be modified by assisting the user with use of the application (e.g., encouraging or prioritizing use of a Q&A system associated with the application).

In addition, the users may continue to be tracked (operation 212) independently of the processing and analysis of interactions associated with the users. For example, the tracking, storing, and processing of the interactions may be performed by separate apparatuses (e.g., servers, computer systems, etc.) to facilitate concurrent execution of operations 202-204, operation 206, and operations 208-210 and/or to decrease the load on the application. If tracking of the users is to continue, the users are selected (operation 202) and tracked (operation 204) without impacting the performance of the application. Interactions between the users and the application are additionally stored as the interactions are detected by the application (operation 206). Finally, activity histories may periodically be obtained (operation 208-210) for the users and used to facilitate subsequent real-time use of the application until the application is no longer used by the users and/or adopted by the users.

Figure 3:
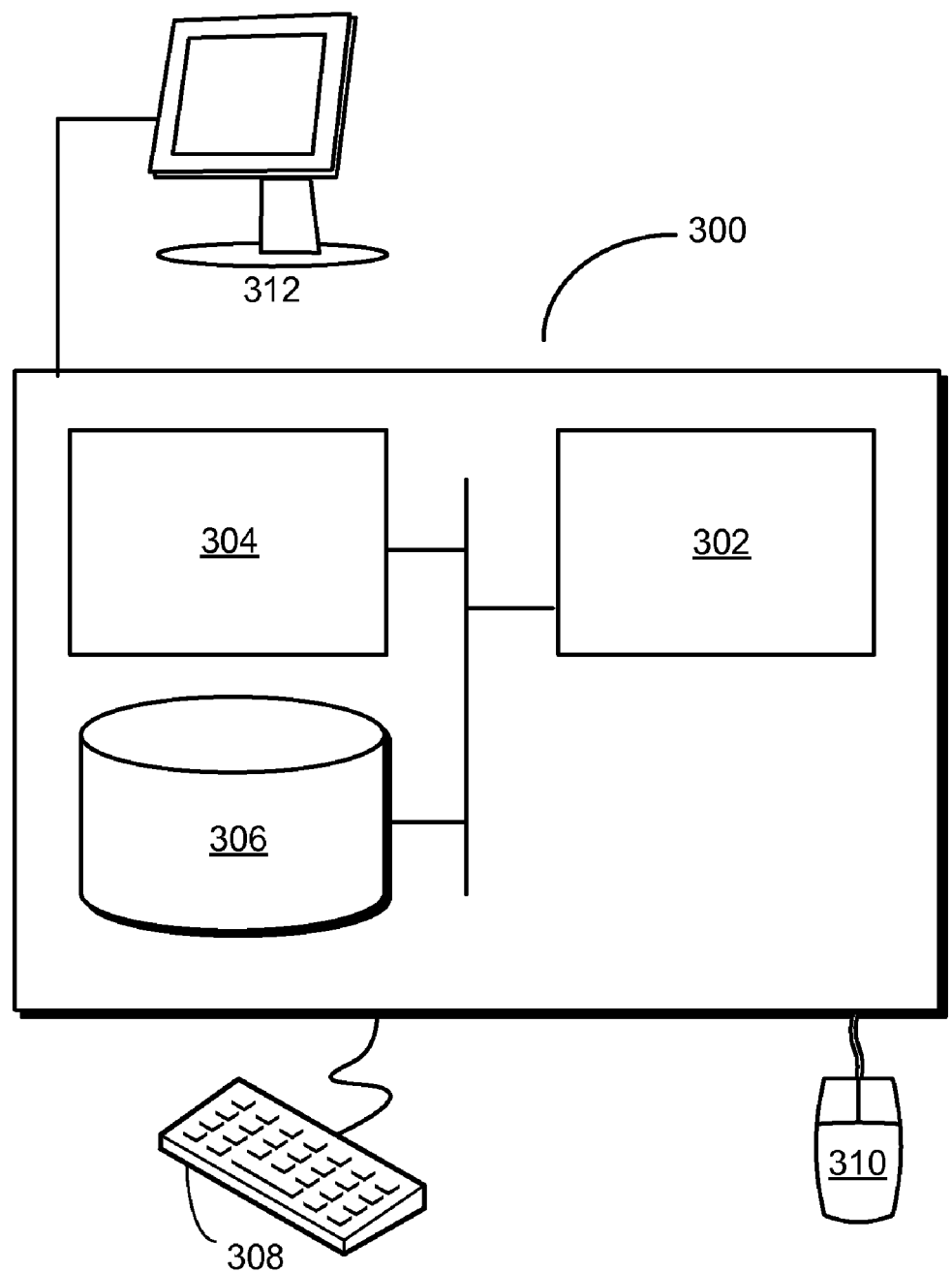
FIG. 3 shows a computer system in accordance with an embodiment.

FIG. 3 shows a computer system 300 in accordance with an embodiment. Computer system 300 may correspond to an apparatus that includes a processor 302, memory 304, storage 306, and/or other components found in electronic computing devices. Processor 302 may support parallel processing and/or multi-threaded operation with other processors in computer system 300. Computer system 300 may also include input/output (I/O) devices such as a keyboard 308, a mouse 310, and a display 312.

Computer system 300 may include functionality to execute various components of the present embodiments. In particular, computer system 300 may include an operating system (not shown) that coordinates the use of hardware and software resources on computer system 300, as well as one or more applications that perform specialized tasks for the user. To perform tasks for the user, applications may obtain the use of hardware resources on computer system 300 from the operating system, as well as interact with the user through a hardware and/or software framework provided by the operating system.

In one or more embodiments, computer system 300 provides a system for monitoring an application. The system may include a monitoring apparatus in the application that tracks a set of interactions between a set of users and the application without impacting the performance of the application. The monitoring apparatus may also store the interactions as the interactions are detected. The system may also include an interaction-processing apparatus that periodically processes, for each user from the set of users, a subset of the stored interactions associated with the user to obtain an activity history for the user. The activity history may then be used to facilitate subsequent real-time use of the application by the user.

In addition, one or more components of computer system 300 may be remotely located and connected to the other components over a network. Portions of the present embodiments (e.g., monitoring apparatus, interaction-processing apparatus, etc.) may also be located on different nodes of a distributed system that implements the embodiments. For example, the present embodiments may be implemented using a cloud computing system that facilitates use of an application by a set of users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for monitoring use of an application, comprising:
   using the application to track a set of interactions between a set of users and the application without impacting the performance of the application, wherein said using includes adjusting the set of users by:
   adding a user to the set of users if a performance requirement is met by the application, and
   removing a user from the set of users if the performance requirement is not met by the application;
   storing the interactions as the interactions are detected by the application; and
   for each user from the set of users, periodically processing a subset of the stored interactions associated with the user to obtain an activity history for the user, wherein the activity history is used to facilitate subsequent real-time use of the application by the user.

2. The computer-implemented method of claim 1, wherein periodically processing the subset of the stored interactions associated with the user to obtain an activity history for the user involves at least one of:
   processing the subset of the stored interactions upon detecting a pre-specified number of interactions between the user and the application; and
   processing the subset of the stored interactions during a key stage of interaction between the user and the application.

3. The computer-implemented method of claim 2, wherein the key stage of interaction is at least one of initial use of the application, purchase of the application, and use of a complex feature in the application.

4. The computer-implemented method of claim 1, wherein each of the interactions corresponds to a page click or text input from the user.

5. The computer-implemented method of claim 1, wherein subsequent real-time use of the application by the user is facilitated by:
   using the activity history to predict a probability of a user action in the application by the user; and
   modifying the probability by assisting the user with use of the application.

6. The computer-implemented method of claim 5, wherein the user action is at least one of:
   discontinued use of the application; and
   use of technical support for the application.

7. A system for monitoring use of an application, comprising:
   a processor;
   a monitoring apparatus in the application, wherein the monitoring apparatus is configured to:
   track a set of interactions between a set of users and the application without impacting the performance of the application, wherein said tracking includes adjusting the set of users by:
   adding a user to the set of users if a performance requirement is met by the application, and
   removing a user from the set of users if the performance requirement is not met by the application; and
   store the interaction as the interactions are detected; and
   an interaction-processing apparatus configured to periodically process, for each user from the set of users, a subset of the stored interactions associated with the user to obtain an activity history for the user, wherein the activity history is used to facilitate subsequent real-time use of the application by the user.

8. The system of claim 7, wherein periodically processing the subset of the stored interactions associated with the user to obtain an activity history for the user involves at least one of:
   processing the subset of the stored interactions upon detecting a pre-specified number of interactions between the user and the application; and
   processing the subset of the stored interactions during a key stage of interaction between the user and the application.

9. The system of claim 8, wherein the key stage of interaction is at least one of initial use of the application, purchase of the application, and use of a complex feature in the application.

10. The system of claim 7, wherein each of the interactions corresponds to a page click or text input from the user.

11. The system of claim 7, wherein subsequent real-time use of the application by the user is facilitated by:
    using the activity history to predict a probability of a user action in the application by the user; and
    modifying the probability by assisting the user with use of the application.

12. The system of claim 11, wherein the user action is at least one of:
    discontinued use of the application; and
    use of technical support for the application.

13. A non-transitory computer-readable storage medium storing instructions that when executed by a computer cause the computer to perform a method for monitoring use of an application, the method comprising:
    using the application to track a set of interactions between a set of users' and the application without impacting the performance of the application, wherein said using includes adjusting the set of users by:
    adding a user to the set of users if a performance requirement is met by the application, and
    removing a user from the set of users if the performance requirement is not met by the application;
    storing the interactions as the interactions are detected by the application; and
    for each user from the set of users, periodically processing a subset of the stored interactions associated with the user to obtain an activity history for the user, wherein the activity history is used to facilitate subsequent real-time use of the application by the user.

14. The computer-readable storage medium of claim 13, wherein periodically processing the subset of the interactions associated with the user to obtain an activity history for the user involves at least one of:
    processing the subset of the stored interactions upon detecting a pre-specified number of interactions between the user and the application; and
    processing the subset of the stored interactions during a key stage of interaction between the user and the application.

15. The computer-readable storage medium of claim 14, wherein the key stage of interaction is at least one of initial use of the application, purchase of the application, and use of a complex feature in the application.

16. The computer-readable storage medium of claim 13, wherein each of the interactions corresponds to a page click or text input from the user.

17. The computer-readable storage medium of claim 13, wherein subsequent real-time use of the application by the user is facilitated by:
  using the activity history to predict a probability of a user action in the application by the user; and
  modifying the probability by assisting the user with use of the application.

18. The computer-readable storage medium of claim 17, wherein the user action is at least one of:
  discontinued use of the application; and
  use of technical support for the application.

19. A computer-implemented method for monitoring use of an application, comprising:
  using the application to track a set of interactions between a set of users and the application without impacting the performance of the application;
  storing the interactions as the interactions are detected by the application; and
  for each user from the set of users, periodically processing a subset of the stored interactions associated with the user to obtain an activity history for the user, wherein the activity history is used to facilitate subsequent real-time use of the application by the user; and
  wherein said processing involves at least one of:
    processing the subset of the stored interactions upon detecting a pre-specified number of interactions between the user and the application; and
    processing the subset of the stored interactions during a key stage of interaction between the user and the application.

20. The computer-implemented method of claim 19, wherein the key stage of interaction is at least one of initial use of the application, purchase of the application, and use of a complex feature in the application.

21. A computer-implemented method for monitoring use of an application, comprising:
  using the application to track a set of interactions between a set of users and the application without impacting the performance of the application;
  storing the interactions as the interactions are detected by the application; and
  for each user from the set of users, periodically processing a subset of the stored interactions associated with the user to obtain an activity history for the user, wherein the activity history is used to facilitate subsequent real-time use of the application by:
  using the activity history to predict a probability of a user action in the application by the user, wherein the user action is at least one of:
    discontinued use of the application; and
    use of technical support for the application; and
  modifying the probability by assisting the user with use of the application.

* * * * *